Patented May 30, 1950

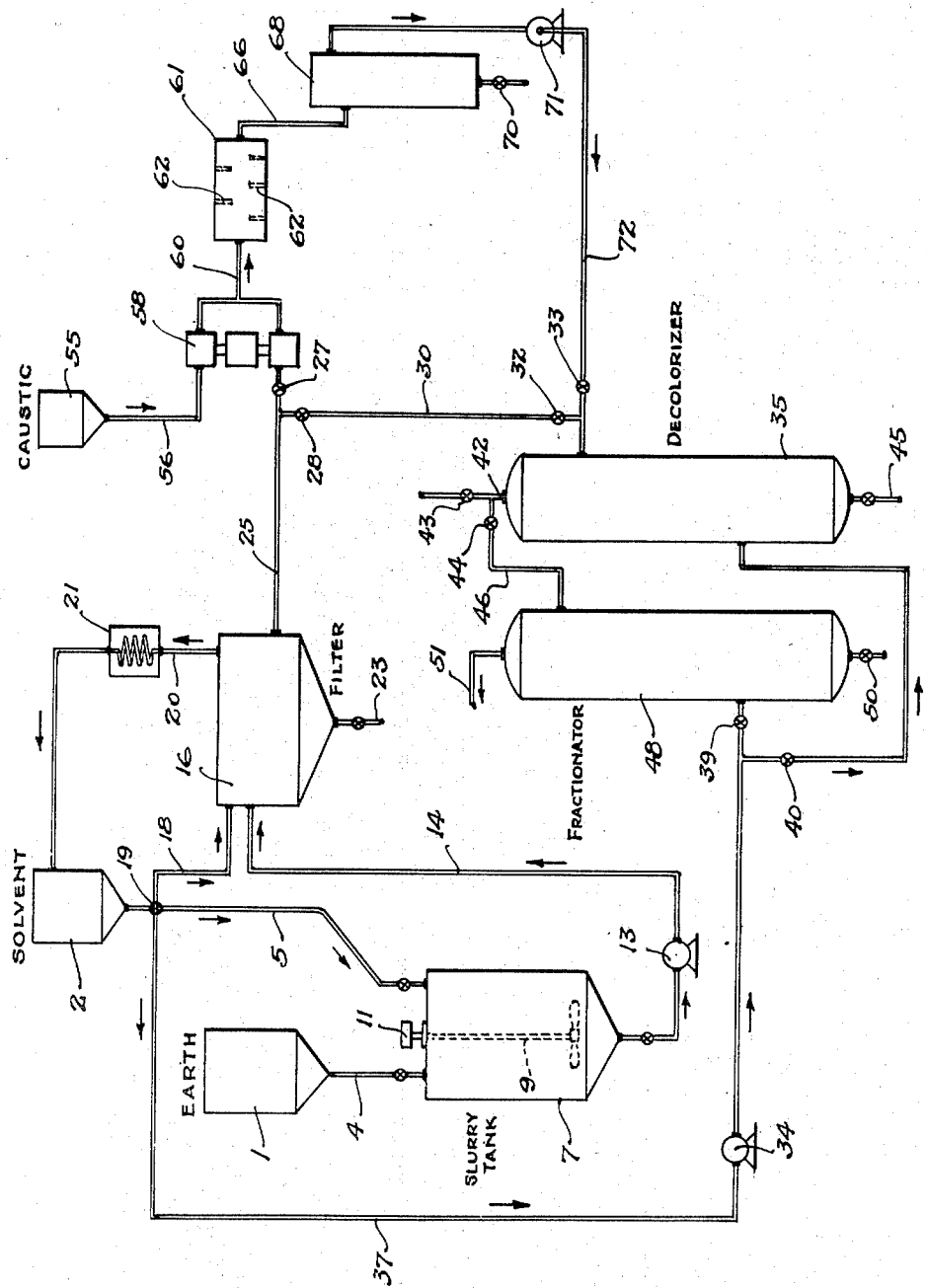

2,509,509

UNITED STATES PATENT OFFICE 2,509,509

TREATMENT OF SPENT BLEACHING AGENTS

William M. Leaders and William Argue, Houston, Tex., assignors, by mesne assignments, to Swift & Company, a corporation of Illinois Application July 11, 1947, Serial No. 760,248

5 Claims. (Cl. 260—428.5)

The present invention relates to a process of treating used adsorbent material employed in the bleaching of fats and oils. More particularly the invention has to do with a solvent treatment of the aforesaid material, such as fuller's earth, to recover the oil contained therein and to produce a decolorized, improved fraction from the recovered oil.

Heretofore it has not been feasible to treat bleaching materials to recover the oil therefrom. In attempting, for example, to obtain an edible product from a spent fuller's earth used in the preparation of a food product, a difficult problem is the separation of inedible oxidized oil from the non-oxidized edible fraction. The refining loss attendant such a separation does not justify the recovery of the oil for reuse in edible products. It has been more advantageous, therefore, to use spent earth for grading and filling-in purposes than to treat it for the recovery of the oil content. Since the amount of oil retention in bleaching earth is substantial, often exceeding 25 per cent based on the weight of the dry earth, the loss of the oil, together with the loss of the earth, represents a substantial impairment of the efficiency of oil refining operations.

An object of the invention is to provide a commercial process of recovering the oil contained in spent bleaching materials employed in the refining of fats and oils.

A further object of the invention is to provide a process of producing a decolorized oil fraction from the oil contained in spent bleaching agents.

Another object of the invention is to provide a process of producing a decolorized non-oxidized oil fraction from the oil contained in spent bleaching earths.

Yet another object of the invention is to provide a process of treating spent bleaching earth whereby the oil-free earth may be more easily conditioned for reuse.

The invention contemplates broadly the treatment of used bleaching agents, such as fuller's earth, with a normally gaseous hydrocarbon solvent to extract the oil contained therein. The extracted oleaginous material may be further subjected to conditions of temperature, pressure and solvent to oil ratio so as to effect a separation of the extracted oil into fractions.

In accordance with the invention, the spent bleaching material, such as fuller's earth, is mixed with a sufficient amount of a liquefied normally gaseous hydrocarbon solvent, such as liquefied propane, to extract the oil from the earth and form a slurry therewith. The slurry is then introduced into a filter or similar equipment, for example, a settling tank, to separate the oil solution from the solid earth. After filtration, the solution may be charged to a tower maintained under such conditions of temperature, pressure and solvent to oil ratio as to effect the formation of two phases, a large top decolorized phase containing a greater proportion of solvent, non-oxidized oil and a smaller bottom phase containing color bodies, gums and oxidized oil. In the event it is desired to remove the free fatty acids from the oil recovered from the earth, the oil solution may be treated with an alkaline material for the neutralization of the fatty acids and the resulting soaps removed from the oil prior to charging the oil solution to the fractionating tower. When the free fatty acid content of the oil recovered from the bleaching earth is not removed, the free fatty acids present in the oil appear in the fraction containing the non-oxidized oil fraction.

In case it is desired to utilize the oxidized oil fraction as, for example, in the manufacture of paints, the conditions of fractionation may be altered so that both the oxidized and non-oxidized oil fractions are caused to appear in one phase, and the color bodies, gums and other impurities in another phase; that is, temperatures are maintained sufficiently high to dissolve the relatively light color material, while leaving undissolved the non-fatty materials, including the color bodies. Following the decolorization operation, the decolorized fraction may in a second column be subjected to altered conditions of temperature, pressure and solvent to oil ratio whereby a separation of the oxidized oil fraction from the non-oxidized oil may be obtained.

The invention will be more fully understood by reference to the accompanying drawing.

Referring more particularly to the drawing, the numeral 1 represents a bin for the storage of used bleaching agent, such as spent fuller's earth. The numeral 2 represents a holding tank for the solvent, such as liquefied propane. The earth is introduced through line 4 into a slurry tank 7, while sufficient propane to extract the oil from the earth and form a slurry with the earth is introduced into the slurry tank through line 5. Slurry tank 7 is provided with suitable means to facilitate the formation of a slurry, such as a stirrer 9 attached to a pulley 11, driven by a motor not shown. Following the formation of the slurry of liquefied propane and spent earth, the slurry is pumped by means of pump 13 through line 14 into a filter 16. Filter 16 represents any suitable means for the separation of solid earth from the oil solution, for example, a settling tank or a continuous pressure filter; in the latter case additional liquefied solvent for washing purposes may be introduced into the filter from solvent storage tank 2 through line 18 by suitable control of valve 19. Uncondensed solvent may be removed from the pressure filter through line 20, condensed in condenser 21 and returned to the solvent storage tank.

The oil-free earth may be withdrawn from filter 16 through line 23 and taken to a solvent stripper, not shown. The solution of oil and solvent is removed from the filter through line 25 and by appropriate manipulation of valves 27 and 28 conducted through line 30, and by suitable control of valves 32 and 33 charged to fractionator, or decolorizer, 35. Additional propane from solvent storage tank 2 may be pumped by means of pump 34 into decolorizer 35 through line 37 by suitable control of valves 39 and 40. Operating conditions in decolorizer 35 may be such as to effect a fractionation of the charged oil into two fractions, a top lighter phase containing decolorized non-oxidized oil in a greater proportion of solvent, and a bottom phase containing color bodies, gums and oxidized oil in a lesser proportion of solvent. The top fraction may be withdrawn from the decolorizer through line 42 and proper manipulation of valves 43 and 44, while the bottom fraction may be withdrawn from the decolorizer through line 45. By altering the operating conditions in tower 35, the oxidized oil may be caused to appear in the top fraction along with the non-oxidized oil. A further fractionation of the top fraction may be effected by charging the said fraction through line 46 and by suitable control of valves 43 and 44 to a second tower 48, wherein by varying the operating conditions, two fractions are formed, a bottom fraction containing oxidized oil may be withdrawn from the tower through line 50, and a top fraction of non-oxidized oil in a greater proportion of solvent which may be removed from the top of the tower through line 51. Propane may be introduced into tower 48 by means of line 37 and suitable control of valves 39 and 40.

When it is desired to neutralize the free fatty acid content of the oil prior to fractionation, the proper amount of alkaline reagent, for example, a caustic solution of the desired strength held in tank 55 may be drawn through line 56 by means of proportioning pump 58. The solvent oil solution may also by means of proportioning pump 58 be withdrawn in the proper ratio of solution to caustic reagent from filter 16 through line 25 and by suitable control of valves 27 and 28.

By means of the proportioning pump, a common stream of caustic and oil is formed and is conducted through line 60 into mixer 61, which may be a tubular member provided with baffles 62 to cause turbulence of the materials flowing therethrough and thus provide for intimate admixture thereof. Following the mixing operation, the mixture is introduced through line 66 into a settling zone 68, such as a circular settling column, wherein the neutralized fatty acids, or soaps, are allowed to settle. The soaps may be withdrawn from the bottom of settling column through line 70, while the oil solution, minus the free fatty acids, may be pumped by means of pump 71 through line 72 into decolorizer 35 and subjected to the fractionation treatment hereinabove described.

In extracting the oil from spent earth, the amount of solvent may be varied according to the quantity of fatty material contained in the solid matter to be extracted and also according to the degree of fractionation desired following the extraction process. It has been found that a solvent to oil present in the spent earth ratio of from about 5 to 15 to 1 by volume in most cases is sufficient to effect extraction of the earth and form a slurry therewith. During the extraction step the temperature of the solvent is maintained relatively low so as to obtain the maximum solvent action of the propane. Temperatures between about 100° F. and 130° F. and pressures between about 225 and 310 pounds per square inch to maintain the solvent in the liquid form have been found satisfactory for most cases.

The conditions contemplated in the separation of color bodies and gum, together with the oxidized oil from the non-oxidized oil, are a solvent to oil ratio ranging from 15 to 30 to 1, temperatures ranging between about 175° F. and 190° F., and pressures of about 490 to 575 pounds per square inch. At these operating conditions a bottom fraction is obtained containing color bodies, gums, oxidized oil and other impurities, amounting to about 5 to 25 per cent of the oil charged to the fractionator.

In the event it is desired to first effect a decolorization of the oil, followed by a subsequent fractionation of the decolorized oil to separate the oxidized oil portion from the non-oxidized oil, operating conditions are such that a small bottom fraction is formed, usually representing about 1 to 2 per cent of the charged oil. Decolorization of the oil may be effected at a temperature between about 160° F. and 170° F., a pressure of about 430 to 470 pounds per square inch, and a solvent to oil ratio between about 15 to 30 to 1. At these operating conditions a small bottom fraction containing the color bodies and a top phase containing oxidized and unoxidized oil are obtained.

Operating conditions in the second tower are such as to effect a separation of oxidized oil from the non-oxidized oil. Suitable operating conditions for accomplishing this purpose are a solvent to oil ratio of about 20 to 30 to 1, temperatures between about 170 and 180° F. and pressures ranging from 470 to 550 pounds per square inch. Such operating conditions produce two fractions, a relatively small bottom fraction containing the oxidized oil amounting to about 3 to 20 per cent of the charged material, and a larger top fraction containing non-oxidized oil, the size of the bottom fraction depending on the quantity of oxidized oil in the charged material and varying with the temperature, that is, the higher the temperature, the larger the cut or fraction.

The alkaline reagent employed for the neutralization of the free fatty acid content of the oil may be any material capable of reacting with the free fatty acids to form soap, and may include alkali metal and alkaline earth metal hydroxides. We have found that a 20° Bé. caustic soda or potash solution is satisfactory for most purposes.

The invention contemplates the treatment of the various bleaching adsorbent agents, including filter aids, used, for example, in the treatment of spermaceti. Such bleaching materials are decolorizing earths and clays, natural and activated, activated carbon or charcoal and combinations of these. The invention is applicable to the extraction of the various aforesaid bleaching materials to recover various oils from the bleaching materials and to produce valuable fractions from the recovered oils. Such bleaching materials are used in the treatment of fatty acids, such as red oil and commercial stearic acid; paint oils, such as linseed oil, tung oil, and perrilla oil. Examples of other fatty materials which may be extracted from bleaching agents used in connection therewith are coconut, palm, cottonseed, sunflower, sesame seed, rapeseed, and lard oils; greases, lard, fish oils, and the fatty acids thereof.

Although liquefied propane is the preferred solvent, other normally gaseous hydrocarbons and mixtures thereof may be suitably employed, for example, butane, isobutane, propylene, butylene and ethane.

As an example of the invention, an acid-activated bleaching earth which had been employed in the bleaching of tallow prior to soapmaking and which contained about 20 per cent of fat based on the dry weight of the earth and having a free fatty acid content of 4 per cent was mixed with about 5 volumes of liquefied propane, and a slurry of oil and solvent was formed. The temperature of the mixing operation was maintained around 120° F. and the pressure about 250 pounds per square inch to maintain the solvent in the liquid phase. After the mixing operation, the slurry was pumped into the middle section of an unpacked settling tower, wherein a rapid separation of solvent-oil solution from the earth occurred. The earth was removed from the bottom of the tower, stripped of solvent and conditioned for reuse by firing. The propane oil solution was withdrawn from the top of the settling tank and mixed with sufficient 20° Bé. sodium hydroxide solution to neutralize the free fatty acids. The mixture was allowed to settle to remove the soaps resulting from the neutralization of the free fatty acids. The soap-free oil solution was charged to a packed fractionating column to decolorize the oil. Simultaneously with the introduction of the oil propane solution into the decolorizer, there was introduced therein additional propane to raise the ratio of solvent to oil to about 20 to 1. The temperature in the tower was raised to about 175° F. and the pressure to 480 pounds per square inch to maintain the solvent in the liquid phase. Under these conditions, a bottom fraction amounting to about 10 per cent of the charged material was obtained. This fraction contained color bodies, gums, resins, and oxidized oleaginous material. From the top of the tower there was withdrawn an overhead fraction comprising a greater proportion of the solvent. Upon removal of the solvent a decolorized tallow was recovered. The recovered tallow was of sufficiently good quality to be used in the maufacture of a superior grade of soap chips.

As a further example of the invention, a spent bleaching clay obtained from the bleaching of a cottonseed oil which was used in the manufacture of margarine, containing about 25 per cent of oil based on the dry weight of the earth, was mixed with 5 volumes of liquefied propane, whereby a slurry of oil and solvent was formed. The temperature of the mixing operation was maintained at around 120° F. and the pressure at about 250 pounds per square inch to maintain the solvent in the liquid phase. After the mixing operation, the slurry was pumped into a continuous pressure filter, wherein a clear solution of fat and solvent was separated from the spent bleaching earth. The solution of fat and solvent was then charged to a fractionating column in which the solvent to oil ratio was raised to 20 to 1. The temperature was also raised to 165° F. and the pressure to 450 pounds per square inch. Under these operating conditions a bottom fraction containing about 2 per cent of the material charged to the tower was obtained. Upon removal of the solvent from this material a highly colored viscous mass containing the color bodies, gums, resins and other impurities was obtained. A decolorized overhead fraction was maintained in a greater proportion of the solvent and was introduced into a second fractionating tower to separate the oxidized oil from the non-oxidized oil. In order to effect such a separation, the solvent to oil ratio was increased to 25 to 1, the temperature to 185° F., and the pressure to 550 pounds per square inch. Under these operating conditions a bottom cut was obtained which contained about 18 per cent of the material charged to the second fractionator. This material, on analysis, showed it to be mainly oxidized fatty acids and glycerides and a small amount of non-oxidized fatty material. The overhead fraction after removal of the solvent was a neutral oil of good flavor and had a color of 12 yellow, 1.0 red, on a 5¼ inch Lovibond scale. This material after deodorization was used in the manufacture of more margarine.

In addition to the recovery of the oil retained by the adsorbent agents used in the bleaching of fats and oils, and the separation of the recovered oil into valuable fractions, a further advantage of the invention resides in the reuse of the spent earth. The use of a normally gaseous hydrocarbon solvent in extracting the earth affords an effective and efficient method of liberating the retained oil. Consequently the earth, relatively free from oil, may, after solvent stripping, be readily conditioned for reuse. Because of the absence of oil in the earth, it is possible to shorten the time and moderate the intensity of the firing treatment employed in the reactivation thereof, thus facilitating the reuse of the earth.

Obviously, many modifications and variations of the invention, as hereinbefore set forth, may be made without departing from the spirit and scope thereof, and therefore only such limitations should be imposed as are indicated in the appended claims.

We claim:

1. A process for the recovery of valuable materials from spent adsorbent material employed in the refining of fats and oils and containing substantial quantities of oxidized and nonoxidized oleaginous material and nonfatty material, including color bodies, which comprises: extracting said bleaching material in the form of a slurry with a liquefied normally gaseous hydrocarbon solvent at a temperature between about 100 and 130° F. to remove simultaneously said oleaginous and nonfatty material from the said bleaching material; subjecting the resulting solution after separation from the extracted bleaching material and while maintaining a solvent ratio of between about 15 to 30 volumes of hydrocarbon to 1 volume of oil to a temperature between about 160 and 190° F. under sufficient pressure to maintain the hydrocarbon in the liquid phase, thereby forming two phases, one of said phases containing decolorized fatty material and the other of said phases containing impurities, including color bodies; and separating the phases to recover valuable materials therefrom.

2. A process for the recovery of valuable materials from spent bleaching material employed in the refining of fats and oils and containing substantial quantities of oxidized and nonoxidized oleaginous material and nonfatty material, including color bodies, which comprises: mixing the spent adsorbent material having adsorbed thereon oil containing oleaginous and nonfatty material with a liquefied normally gaseous hydrocarbon in a ratio of from approximately 5 to 15 volumes of the said hydrocarbon to 1 volume of the oil in the adsorbent material; maintaining the said slurry at a temperature of between approximately 100 and 130° F. to form a solution of the oleaginous and nonfatty material; separating the said solution from the adsorbent material; introducing the said solution into a fractionating chamber with additional liquefied normally gaseous hydrocarbon to increase the solvent ratio between 15 and 30 volumes of hydrocarbon to 1 volume of oil; maintaining the temperature of said solution between approximately 160 and 190° F. while maintaining the hydrocarbon liquefied, whereby two fractions are formed, the said top fraction containing oleaginous material substantially free of color bodies and the bottom fraction containing nonfatty material, including color bodies; and separating the said fractions to obtain the valuable materials therefrom.

3. A process for the recovery of valuable materials from spent adsorbent material employed in the refining of fats and oils, which comprises: mixing the spent adsorbent material having adsorbed thereon oil containing oleaginous and nonfatty material with a liquefied normally gaseous hydrocarbon in a ratio of from approximately 5 to 15 volumes of the said hydrocarbon to 1 volume of the oil in the adsorbent material; maintaining the resulting mixture at a temperature of between approximately 100 and 130° F. to form simultaneously a solution of the oxidized and nonoxidized oleaginous material and nonfatty material, including color bodies, contained in the said adsorbent material; separating the said solution from the adsorbent material while at the said temperature; introducing the said solution after separating from the adsorbent material into a fractionating chamber with additional liquefied normally gaseous hydrocarbon to increase the solvent ratio to between approximately 15 and 30 volumes of hydrocarbon to 1 volume of oil; maintaining the temperature between approximately 170 and 190° F. while maintaining the hydrocarbon liquefied, whereby top and bottom fractions are formed, the said bottom fraction containing oxidized oil and nonfatty material, including color bodies; and separating the said fractions to obtain a decolorized nonoxidized oil from the said top fraction.

4. A process for the recovery of valuable materials from spent bleaching material employed in the refining of fats and oils and containing substantial quantities of oxidized and nonoxidized oleaginous material and nonfatty material, including color bodies, which comprises: extracting said adsorbent material in the form of a slurry with a liquefied normally gaseous hydrocarbon solvent at a temperature between 100 and 130° F. to simultaneously remove from the adsorbent material the oleaginous and nonfatty material; separating the solution from the said adsorbent material at the said temperature; subjecting the said solution to a temperature of between 160 and 170° F. while maintaining said solvent in the liquid phase after adjusting the solvent ratio to between approximately 15 to 30 volumes of hydrocarbon to 1 volume of oil, thereby selectively dissolving the oleaginous material while leaving undissolved the nonfatty material, including the color bodies; charging the resulting decolorized material and fatty material to a fractionating column at a temperature between approximately 170 and 190° F. while maintaining the solvent in a liquid phase, whereby two fractions are produced, the upper of said fractions being relatively rich in nonoxidized oleaginous material and the lower of said fractions containing the oxidized oleaginous material; and separating the said phases to recover the valuable material therefrom.

5. A process for the recovery of valuable materials from spent adsorbent material employed in the bleaching of fats and oils and containing substantial quantities of fatty material, including free fatty acids and oxidized and nonoxidized oil, and nonfatty materials, including color bodies, which comprises: extracting said adsorbent material with from about 5 to 15 volumes of liquefied normally gaseous hydrocarbon at a temperature between about 100 and 130° F. to remove simultaneously the fatty and nonfatty material from the said adsorbent material; treating the resulting solution after separation from the adsorbent material with an alkaline material to remove the free fatty acids therefrom as insoluble; thereafter charging the solution to a fractionation tower together with additional liquefied solvent to increase the solvent ratio to between about 15 to 30 volumes of solvent to 1 volume of oil while maintaining the temperature between about 160 and 190° F. and under pressure maintaining the solvent in a liquid state, thereby effecting the formation of two liquid fractions, the upper of which contains valuable fatty material substantially free of color bodies; and separating the said fractions to recover the valuable material therefrom.

WILLIAM M. LEADERS.
WILLIAM ARGUE.

REFERENCES CITED

The following references are of record in the file of this patent:

UNITED STATES PATENTS

| Number | Name | Date |
|---|---|---|
| 2,040,056 | Manley | May 5, 1936 |
| 2,067,802 | Tears | Jan. 12, 1937 |
| 2,113,010 | Tears | Apr. 5, 1938 |
| 2,118,454 | Schaafsma | May 24, 1938 |
| 2,246,227 | Webb | June 17, 1941 |
| 2,394,968 | Van Orden | Feb. 12, 1946 |

Certificate of Correction

Patent No. 2,509,509                                       May 30, 1950

WILLIAM M. LEADERS ET AL.

It is hereby certified that errors appear in the printed specification of the above numbered patent requiring correction as follows:

Column 4, line 48, for "180° F." read *185° F.*; column 8, line 40, after the syllable "soluble" and before the semicolon insert *soaps*;

and that the said Letters Patent should be read with these corrections therein that the same may conform to the record of the case in the Patent Office.

Signed and sealed this 29th day of August, A. D. 1950.

[SEAL]

THOMAS F. MURPHY,
*Assistant Commissioner of Patents.*